Patented Aug. 26, 1924.

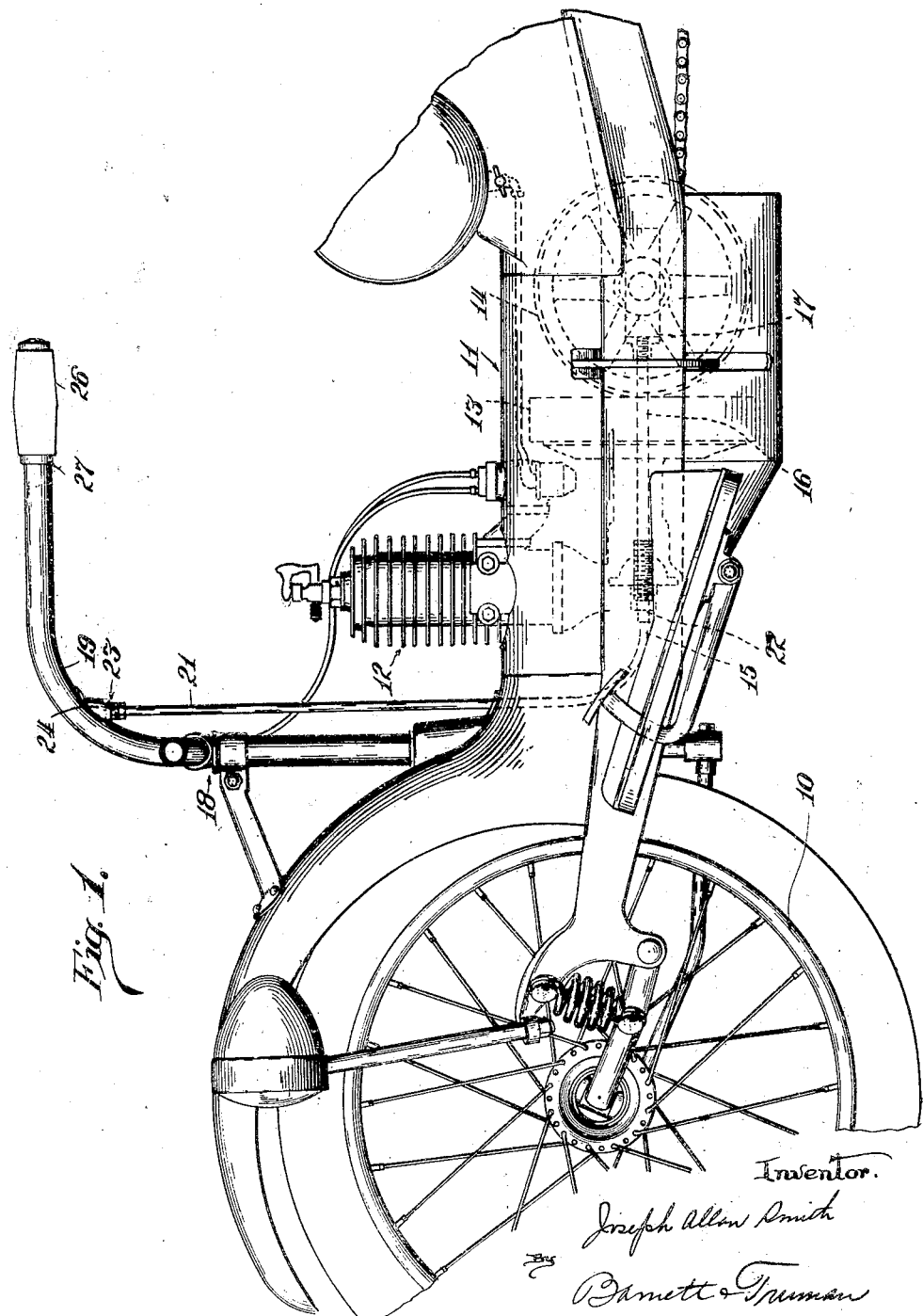

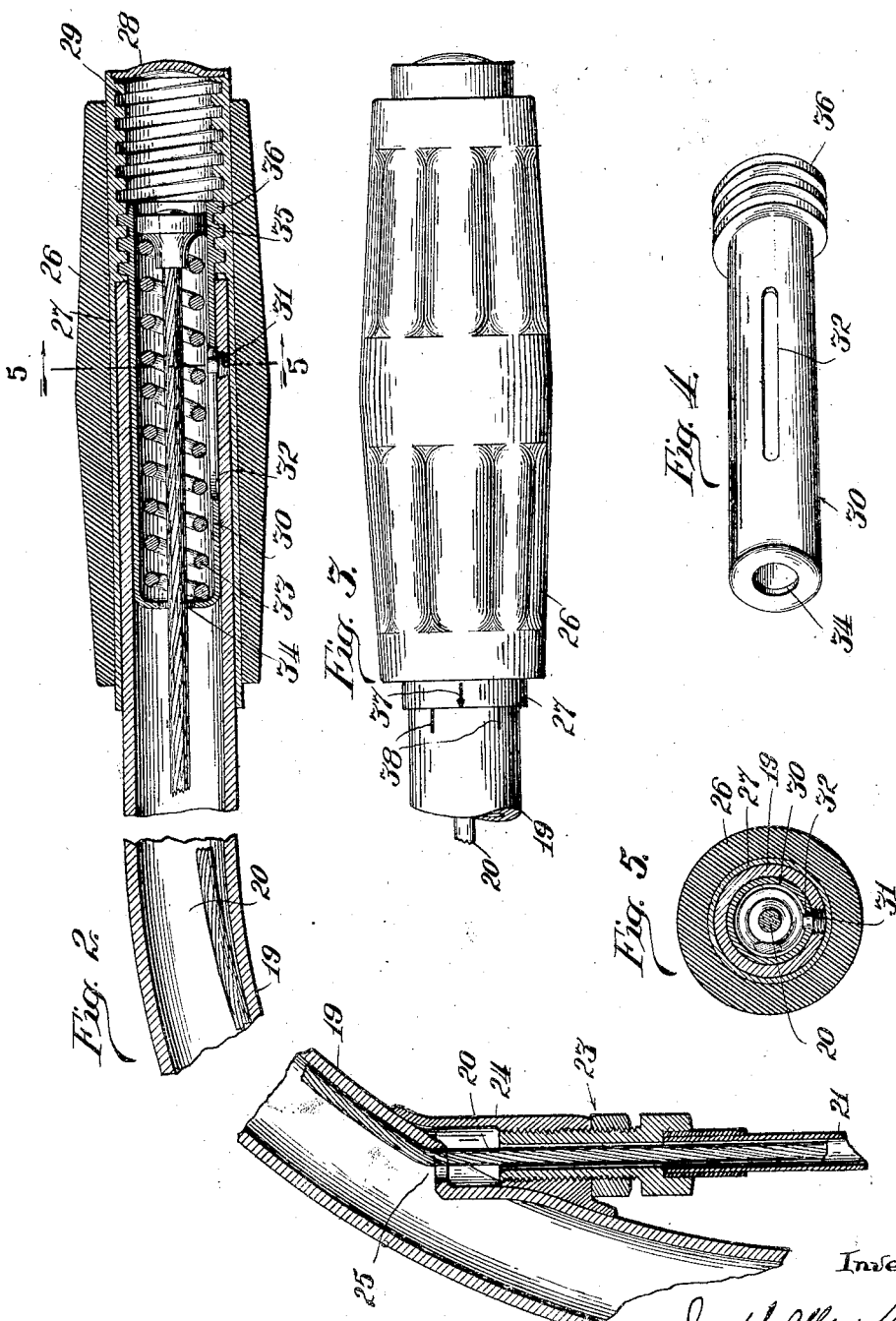

1,506,388

UNITED STATES PATENT OFFICE.

JOSEPH ALLAN SMITH, OF SYRACUSE, NEW YORK, ASSIGNOR TO NER-A-CAR CORPORATION, A CORPORATION OF NEW YORK.

CONTROLLING DEVICE FOR MOTOR CYCLES.

Application filed June 27, 1921. Serial No. 480,775.

*To all whom it may concern:*

Be it known that I, JOSEPH ALLAN SMITH, a citizen of the United States, residing at Syracuse, in the county of Onondaga and State of New York, have invented certain new and useful Improvements in Controlling Devices for Motor Cycles, of which the following is a specification.

My invention relates to a friction transmission mechanism for motor vehicles, especially motor vehicles of the motor cycle type, and is concerned particularly with an improved controlling device for moving one of the friction discs, or equivalent elements, into and out of contact with the other to operatively connect the motor with the drive wheel or wheels of the vehicle and disconnect the same therefrom.

The principal objects of the invention are: To provide a novel and improved device for causing one of the discs to be pressed against the other, resiliently, whereby a better driving contact is obtained and wear on the disc minimized; and to provide means whereby the amount of the pressure exerted as between the discs may be accurately gauged and the application thereof varied intelligently by the driver according to load conditions. The invention contemplates a friction gear controlling device of the general type shown in the applications of Carl A. Neracher filed March 26, 1920 Serial No. 368,963 and August 12, 1921 Serial No. 491,781 in which the handle bar of the motorcycle is provided with a hand grip that may be manipulated to bring the friction discs into and out of contact with each other and in which one of said discs is set to a low speed position and moves automatically in the direction to increase the vehicle speed when the pressure between the discs is relieved. A specific object of the present invention is to improve upon the controlling means as described in the beforementioned applications.

The invention consists in the new and improved arrangements, devices and constructions, to be hereinafter described and claimed, for carrying out the above stated objects and such other incidental objects as may be mentioned.

A preferred embodiment of the invention is illustrated in the accompanying drawings, wherein—

Fig. 1 is a fragmentary view, in elevation, of a motorcycle provided with a friction transmission mechanism and controlling means therefor constructed in accordance with my invention.

Fig 2 is a sectional view of a portion of the handle bar of the vehicle and the devices associated therewith for controlling the friction gearing.

Fig. 3 is a plan view of the hand grip shown in Fig. 2 and the adjacent portion of the handle bar.

Fig. 4 is a view, in perspective, of the spring cage forming part of the controlling device, and Fig. 5 is a sectional view on line 5—5 of Fig. 2.

Referring to the drawings, 10 designates the front or steering wheel of a motorcycle, the body of which is indicated by numeral 11. 12 designates the internal combustion motor for driving the vehicle. 13 is a fly wheel of the motor which constitutes one of the members of the friction gear by means of which the power developed by the engine is transmitted to the driving wheel, or wheels of the vehicle (not shown). 14 designates a friction wheel or disc the shaft of which is mounted on the frame of the vehicle so that the disc may be moved into and out of contact with the fly wheel 13. In the arrangement shown the disc 14 is pulled against the fly wheel by a flexible connection, preferably Bowden wire, 15 attached to a pull rod 16 which is fastened to one of the bearing boxes 17 for the shaft of disc 14, this bearing box being slidably mounted on the frame of the motorcycle. 18 is the steering post of the motorcycle and is provided with a tubular handle bar 19.

The flexible connection 15 consists preferably of a wire cable 20 having a sheathing 21 held between adjusting devices 22, 23, the latter being threaded into a nipple 24 fastened to the handle bar 19 over an opening 25 formed therein. The present invention is not necessarily limited to a friction gearing comprising, as one of its elements, the motor fly wheel, nor to the other constructional features of the motorcycle driving mechanism.

One of the hand grips 26 on handle bar 19 is secured to a sleeve 27 rotatable upon but having a fairly close fit with the end of the handle bar. The outer end of sleeve 27, which is closed by a cap 28, is internally threaded, as indicated at 29. 30 is a tubular spring cage arranged within the handle bar so as to be movable longitudinally thereof, rotation of the sleeve being prevented by a stud 31 which projects into a slot 32 in the cage. Within the cage is arranged a coiled spring 33. The wire cable 20 passes through a perforation 34 in the end of the spring cage 30, through the coils of the spring 33 and is attached to a button 35 bearing against the outer end of the spring. The spring cage is formed at its outer end with a thread 36 engaging the threading 29 on sleeve 27.

When the hand grip 26 is rotated to the left the spring cage is moved outwardly causing the spring 33 to exert a pressure against the button 35 so that the cable 20 pulls disc 14 against the fly wheel 13 of the motor, the pressure of the disc on the fly wheel depending upon the extent to which spring 33 is compressed, that is, upon the amplitude of movement given to the hand grip.

In order that the pressure of the frictionally engaged members of the transmission mechanism one against the other may be determinately varied, the pressures exerted by the spring 33 for different degrees of compression thereof are ascertained and the handle bar or hand grip provided with graduations marked in any suitable manner. For example, I have shown a single mark 37 on the inner end of sleeve 27 which is adapted to be brought into register with a series of circumferentially arranged graduations 38 on the handle bar.

The arrangement above described whereby the members of the friction gearing, when brought into operative contact, are held one against the other by a spring pressure is advantageous for several reasons. It is thereby possible to regulate the pressure between the discs so as to prevent unnecessary drag on the motor which occurs if the pressure is too great, while avoiding slippage between the discs which will result if the pressure is insufficient to carry the load. The pressure exerted remains constant in spite of slight inequalities in the coengaging friction surfaces, due, for example, to wear, and in spite of the vibration to which the gearing will necessarily be subject when the vehicle travels a rough road, the spring automatically taking up any momentary play or looseness between the discs. The spring also acts to lock the hand grip in its rotated position so that the rider does not need to keep a firm hold on the hand grip in order to maintain the transmission of power from the motor to the driving wheel of the vehicle. My invention, therefore, adds to the durability of the transmission mechanism, increases its efficiency and provides a convenient means for controlling the transmission mechanism so far as its clutching function is concerned.

I claim:

1. In a motor driven vehicle having co-engageable friction transmission members, mechanism for controlling the engagement of said members one with the other comprising a hand grip rotatably mounted on a part of the vehicle, a flexible connection between one of said friction members and said hand grip, a spring, and means whereby the spring is stressed when the hand grip is turned to bring said friction member into contact with the other friction member.

2. In a motor driven vehicle having co-engageable friction transmission members, mechanism for controlling the engagement of said members one with the other comprising a hand grip rotatably mounted on a part of the vehicle, a flexible connection between one of said friction members and said hand grip, a spring, and means whereby the spring is stressed when the hand grip is turned to bring said friction member into contact with the other friction member, said hand grip and the part on which it is mounted being provided with indicating marks to show the amount of pressure exerted by the spring at different positions of the hand grip.

3. In a motor driven vehicle having a steering handle bar and co-engageable friction transmission members, mechanism for controlling the engagement of said members one with the other comprising a hand grip movably mounted on said handle bar, a flexible connection between one of said friction members and the hand grip, and a spring which is stressed when said frictional members are brought one against the other.

4. In a motor driven vehicle having a hollow steering handle bar and coengageable friction transmission members, mechanism for controlling the engagement of said members one with the other comprising a hand grip movably mounted on said handle bar, a flexible connection extending through the handle bar, and a spring located in the handle bar which is stressed when said frictional members are brought one against the other.

5. In a motor driven vehicle having a hollow steering handle bar and coengageable friction transmission members, mechanism for controlling the engagement of said members one with the other comprising a hand grip comprising a sleeve slidably arranged on the handle bar with its outer end internally threaded, a spring cage within the handle bar movable lengthwise thereof and threaded to engage the threading of the sleeve, a coiled spring in said cage, and a flexible element operatively connected with one of said frictional members, extending through said cage and provided with means engaging the outer end of said spring.

6. In a motor driven vehicle having a hollow steering handle bar and coengageable friction transmission members, mechanism for controlling the engagement of said members one with the other comprising a hand grip comprising a sleeve rotatably arranged on the handle bar with its outer end internally threaded, a spring cage within the handle bar movable lengthwise thereof and threaded to engage the threading of the sleeve, a coiled spring in said cage, and a flexible element operatively connected with one of said frictional members, extending through said cage and provided with means engaging the outer end of said spring, said sleeve and handle bar being provided with indicating marks to show the pressure developed by the spring at different positions of the hand grip.

7. In a motor driven vehicle having a steering handle bar and coengageable friction transmission members, mechanism for controlling the engagement of said members one with the other comprising a hand grip associated with said handle bar, a spring cage having a threaded relation with the hand grip and a sliding relation with the handle bar, a spring in said cage, and a flexible element operatively connected with one of said frictional members and adapted to engage said spring, whereby the rotation of the hand grip forces one of said frictional members against the other under pressure of said spring.

8. In a vehicle having a hollow handle bar, a hand grip rotatable thereon with a portion projecting therefrom which is interiorly threaded, a spring cage within the handle bar slidable therein longitudinally but non-rotatable with respect thereto having an exteriorly threaded portion for engagement with the threaded portion of the hand grip, a flexible connector extending into said cage and provided with a spring bearing, and a spring in said cage interposed between the end thereof and said spring bearing.

JOSEPH ALLAN SMITH.